United States Patent [19]
Kurr et al.

[11] Patent Number: 5,540,419
[45] Date of Patent: Jul. 30, 1996

[54] ELASTIC BEARING

[75] Inventors: Klaus Kurr, Weinheim; Willi Schweikert, Heidelberg; Armin Barth, Gorxheimertal; Hans-Gerhard Sander, Weinheim, all of Germany

[73] Assignee: Firma Carl Freudenberg, Weinheim, Germany

[21] Appl. No.: 385,254

[22] Filed: Feb. 8, 1995

[30]     Foreign Application Priority Data

Feb. 8, 1994 [DE] Germany ........................... 44 03 860.7

[51] Int. Cl.⁶ ..................................................... F16F 13/00
[52] U.S. Cl. ................. 267/140.13; 267/294; 267/141.1; 267/33; 248/565
[58] Field of Search .......................... 267/140.11, 140.13, 267/140.3, 141.1, 292, 293, 153, 33, 136, 141, 294; 248/562, 565, 636

[56]         References Cited

U.S. PATENT DOCUMENTS 4,887,801 12/1989 Wolf et al. .......................... 267/140.13

FOREIGN PATENT DOCUMENTS

| | | | |
|---|---|---|---|
| 524461 | 5/1956 | Canada | ................................. 248/565 |
| 2840156 | 5/1990 | Germany | . |
| 4139048 | 6/1993 | Germany | .......................... 267/140.11 |
| 0041776 | 3/1977 | Japan | ..................................... 267/140 |

Primary Examiner—Robert J. Oberleitner
Assistant Examiner—Peter M. Poon
Attorney, Agent, or Firm—Kenyon & Kenyon

[57]         ABSTRACT

An elastic bearing includes a support and a thrust bearing. Each is provided with a fastening element and each are braced against each other by at least one elastic spring element of an elastomeric material and at least one damping device. The support includes a supporting body made of a tough material, which extends essentially transverse to the direction of the introduced vibrations. The thrust bearing includes a drum-shaped housing which essentially encloses the supporting body on all sides. The supporting body is adjoined by at least one ring-shaped damping element made of an elastomeric material which, under static preloading of the bearing, abuts on the front-side inner surfaces of the housing in a substantially stress-free manner. In the cylindrical recess of the damping element at least one elastic spring element is arranged axially on both sides of the supporting body. The elastic spring elements, under axial prestressing, are braced between the surface of the supporting body and the respective adjacent front-side inner surface of the housing.

13 Claims, 5 Drawing Sheets

ELASTIC BEARING

BACKGROUND OF THE INVENTION

1. Field of the Invention

The present invention relates to an elastic bearing having a support bearing and a thrust bearing. The support and thrust bearings are each provided with a fastening element and are braced against one another by at least one elastic spring element, made of an elastomeric material, and at least one damping device.

2. Description of the Prior Art

An elastic bearing is shown in German Patent 38 40 156. The bearing of that patent is designed as an engine bearing to support combustion engines, and the support and the thrust bearings of that bearing are braced against one another by a rubber spring and a cup-spring assembly. The rubber spring and the cup-spring assembly are arranged relative to each other in a functionally efficient manner through parallel joining, the cup-spring assembly having the S-shaped characteristic curve of a spring. The two spring elements, which are under static preloading by the engine to be supported, are adjusted to one another in such a way that the spring rate of the cup-spring assembly is essentially zero and the rubber spring is substantially free from elastic tension. This previously-known bearing exhibits good working properties over a long service life and can be used at ambient temperatures of up to 160 ° C. To suppress low-frequency vibrations having high amplitude, this previously-known bearing uses a hydraulic damping device. The hydraulic damping device has two spaces sealed off from the outside which are connected to one another in a manner allowing fluid communication and which are filled with a damping fluid.

SUMMARY OF THE INVENTION

The objective underlying the present invention is to provide a bearing in such a way that, with constantly good damping characteristics for low-frequency vibrations, the bearing has a substantially simplified design and is therefore capable of being produced in a manner which is more cost-effective than prior art bearings. In addition, the bearing of the present invention has compact dimensions.

To solve the objectives of the present invention, the support includes a supporting body made of a tough material which extends essentially transverse to the direction of the introduced vibrations. The thrust bearing includes a drum-shaped housing which essentially encloses the supporting body on all sides. The supporting body is associated with at least one ring-shaped damping element made of an elastomeric material which, under static preloading of the bearing, abuts the from side inner surfaces of the housing in a substantially stress-free manner. In the cylindrical recess of the damping element, at least one elastic spring element is axially arranged respectively on both sides of the supporting body. The elastic spring elements, under axial prestressing, are braced between a surface of the supporting body and the respective adjoining front side inner surface of the housing. In a bearing designed in accordance with the present invention, the importance of simple assembly entailing few parts is to be stressed. The bearing is simple to manufacture from the standpoint of production engineering and is extremely cost-effective from an economic standpoint. The bearing exhibits good working properties over a long service life. The bearing provides advantageous mechanical separation of high-frequency vibrations and the damping of low-frequency vibrations, while avoiding the need for a hydraulic damping device. The first fastening element, the supporting body—which can consist of a metallic material—and the ring-shaped damping element are preferably designed as a unit which can be preassembled. The unit is supported in an elastically flexible manner within the housing—which housing is designed as a thrust bearing—by the two elastic spring elements, in particular by the elastic spring element compressively loaded under static preloading.

According to one advantageous refinement, at least the elastic spring element, which is compressively loaded under static preloading of the bearing, is of a two-piece design. The elastic spring element consists of a ring-shaped spring element of an elastomeric material and a cup-spring assembly including at least two cup springs joined to it in series in a functionally efficient manner. The spring rate of the cup-spring assembly, when compressively loaded under static preloading of the bearing, is essentially zero. The cup-spring assembly is adjusted to the load of the bearing so as to be statically borne to such an extent that the resulting deformation in the non-vibrating state lies substantially within the region of the characteristic curve of a spring extending horizontally. By this means, almost complete compensation for the weight of the structural element to be supported is achieved, resulting in excellent mechanical separating properties of the high-frequency vibrations in the noise generating range which are introduced dependent upon operating conditions. The entire load of the structural element to be supported is borne under static preloading of the deformed cup springs. Dependent on manufacture, the damping element is dimensioned in such a way that it is subject to almost no stress under static preloading. During manufacturing of the bearing, when no structural element to be supported is yet mounted, the side of the damping element facing the machine pan to be supported is pressed onto the inner side of the housing. According to one advantageous refinement, it is provided that the bearing is designed in a substantially symmetrical manner forming a mirror image around the support plate. For that reason, preferably a cup-spring assembly is used in the axial direction on both sides of the support plate, respectively, which cup spring assembly is braced by an adjoining spring element made of elastomeric material. As a result, vibrations contingent upon load changes can be damped/mechanically separated. Such a refinement results in a double-functioning bearing which can absorb stresses both in the direction of compression as well as in the direction of tension. Dependent upon the stresses in the direction of the introduced vibrations, the elastic spring elements, consisting of the elastomeric spring element and the cup-spring assembly arranged in the axial direction on both sides of the support plate, can have characteristic spring curves differing from each other. The ring-shaped spring element causes an improvement in the acoustic isolation, i.e., decoupling, of high frequency vibrations. The elastomeric spring elements do not make a substantial contribution to the spring qualities during normal operational use of the bearing.

In order to reliably assure unaltered good working properties over the entire service life of the bearing, a reinforcement can be arranged on the front side of the spring element facing the cup-spring assembly, which reinforcement encloses the cup-spring assembly in the direction of the introduced vibrations at least partially on the peripheral side. The reinforcement forms an external guide, whereby the reinforcement can be designed as a stop buffer for limiting the relative excursion movements of the supporting body and the housing. The stop buffer is capable of being brought into contact with the supporting body or housing which are axially adjacent and arranged in a manner allowing clearance.

For example, the reinforcement can be formed by a cup-shaped sheet metal ring which is joined adhesively to the respective adjoining spring element. In this configuration, the sheet metal ring carries out a double function, forming the abutment for the cup-spring assembly, thereby making it possible to reliably avoid abrasive wear on the surface of the spring element, as well as forming a stop buffer in order to prevent excessive mechanical stress of the cup-spring assembly and the damping element joined to the supporting body. The stop buffer is capable of being brought into contact with the adjacent stop face in the axial direction, before the cup-spring assembly goes on the block.

The internal guide of the cup-spring assembly can be formed by the first and/or the second fastening element. The allocation of the individual cup springs relative to each other, as well as the assembly of the bearing can be improved and/or simplified by such a refinement.

In order to avoid unwanted tensile stresses within the spring elements and/or the damping element, according to one advantageous refinement, it is provided that the spring element is affixed in a non-adhering manner within the damping element and/or to the supporting body or to the housing, and/or that the damping element joined to the supporting body is arranged in a non-adhering manner within the housing. This refinement causes good relative mobility of the components of the bearing to one another, so that the structural elements do not influence each other negatively during their action.

The spring element can be structured to adjoin, with radial clearance, the inside and outside bearing components respectively which are radially adjacent the spring element. In so doing, it is advantageous that, in the case of stop contacts and barrel-shaped bulgings the incompressible elastomeric material of the spring element does not come in contact with an adjacent, relatively movable structural element of the bearing, so that the vibratory functions as well as minimal wear are ensured.

The damping element can be structured with clearance to the housing, transverse to the direction of the introduced vibrations, and can have at least one stop body, integrally formed with the damping element, which extends in the direction of the housing. The clearance between the stop body and the housing is smaller than the clearance with which the housing encloses the first fastening element of the support penetrating the housing on the front side. It is advantageous that excursion movements transverse to the direction of the vibrations, introduced depending upon operating conditions, are held within permissible bounds, such that the stop bodies cause cushioning. Preferably, the clearance between the stop body and the housing transverse to the direction of the introduced vibrations is 0.5 to 0.7 times the clearance between the first fastening element and the housing on the peripheral side. Unacceptably violent stopping contacts between the structural elements which move relative to each other and accompanying functional impairment of the bearing are reliably eliminated by such a refinement.

Preferably, the housing has a two-piece design and is formed of two half-shells open to one another in the axial direction, the two half-shells being joined to each other in a form-locking manner. One of the half-shells, for example, can be designed to be cup-shaped and cover the damping element in the direction of the vibrations introduced. The second half-shell of the housing is then designed to be lid-shaped, for example, whereby the boundary edge of the cup-shaped half-shell can be joined to the lid-shaped half-shell in a flanging and form-locking manner. Housing refinements differing from that described above and the manner of fixing the parts together are conceivable as well. For example, both half-shells can each be provided on the outer peripheral edge with a flange, the two flange surfaces being able to be coupled to each other by screws. In this connection, it is advantageous that at least one spacing element, for example, in the form of a flat seal, can be arranged between the two flange surfaces. In the case of otherwise equal dimensions of the elastic spring element and the damping element this arrangement allows adjustment of the prestressing, and thus the working properties, of the bearing to the different conditions of the application. For example, if the spacing element consists of an elastically flexible, polymeric material, it is advantageous, that the two housing half-shells are fastened together in an isolating manner with respect to vibrations, and droning noises are prevented. The prestressing on the spring elements can be specifically adjusted by the magnitude of the reciprocal pressing together of the half-shells. Tolerances conditioned by manufacture can be compensated for.

The above described bearing is particularly suitable for use as an engine bearing to support a combustion engine. High-frequency engine vibrations are mechanically separated by the vibration-isolating fastening of the support to the thrust bearing by means of the compressively loaded cup-spring assembly. The cup-spring assembly's working point is arranged in the horizontally running partial area of the characteristic curve of spring of the cup-spring assembly. Slight changes in the travel of the spring, i.e., insignificant vibrational amplitudes at high frequencies, do not result in any change in the spring tension. On the other hand, if the damping of large-amplitude, low-frequency vibrations is necessary, for example, when overshooting the edges of curbstones, the working point of the cup-spring assembly is shifted out of the horizontal region of the characteristic curve of the spring into the direction of the large deflections, by which a progressive build-up of spring stiffness is yielded. At the same time, the damping element, which, for example, can consist of a high-damping flexible foam, is elastically deformed and brings about a suppression of the low-frequency vibration.

The bearing according to the present invention exhibits good working properties over its entire service life and, compared to bearings which are provided with a hydraulic damping device, is able to be produced substantially more cost-effectively and assembled more simply.

BRIEF DESCRIPTION OF THE DRAWINGS

Three exemplary embodiments of the bearing according to the present invention are explained in more detail below and with reference to the appended drawing figures, in which.

DETAILED DESCRIPTION OF THE DRAWINGS

Figure 1:
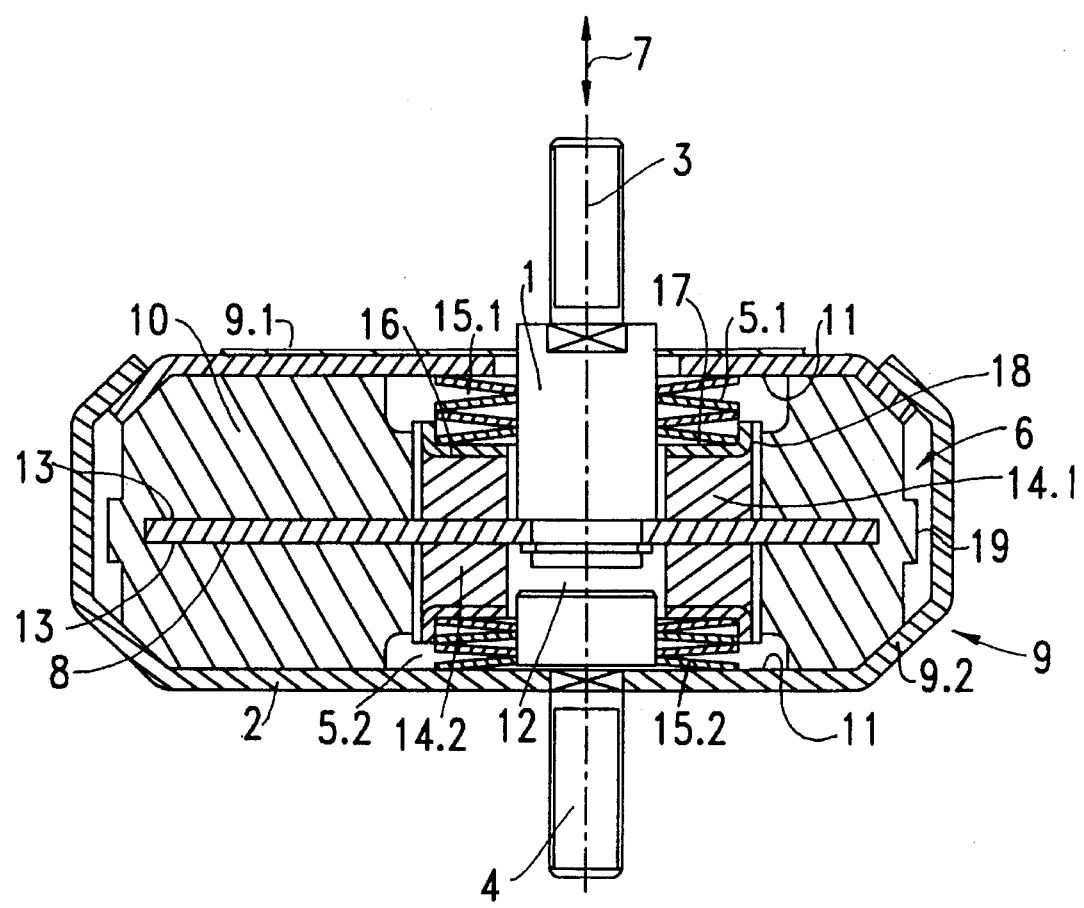
FIG. 1 shows a first exemplary embodiment of the bearing according to the present invention in cross-section.
Figure 3:
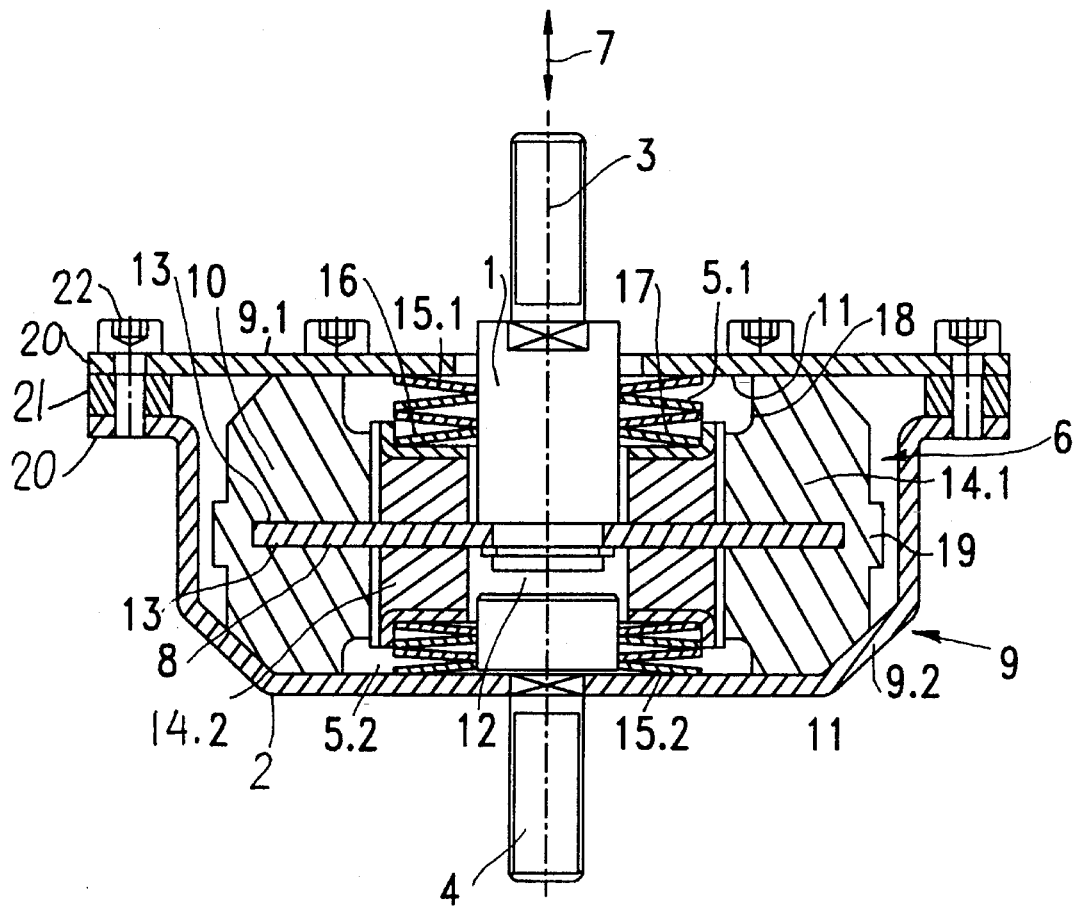
FIG. 3 shows a second exemplary embodiment of the bearing according to the present invention in cross-section.
Figure 5:
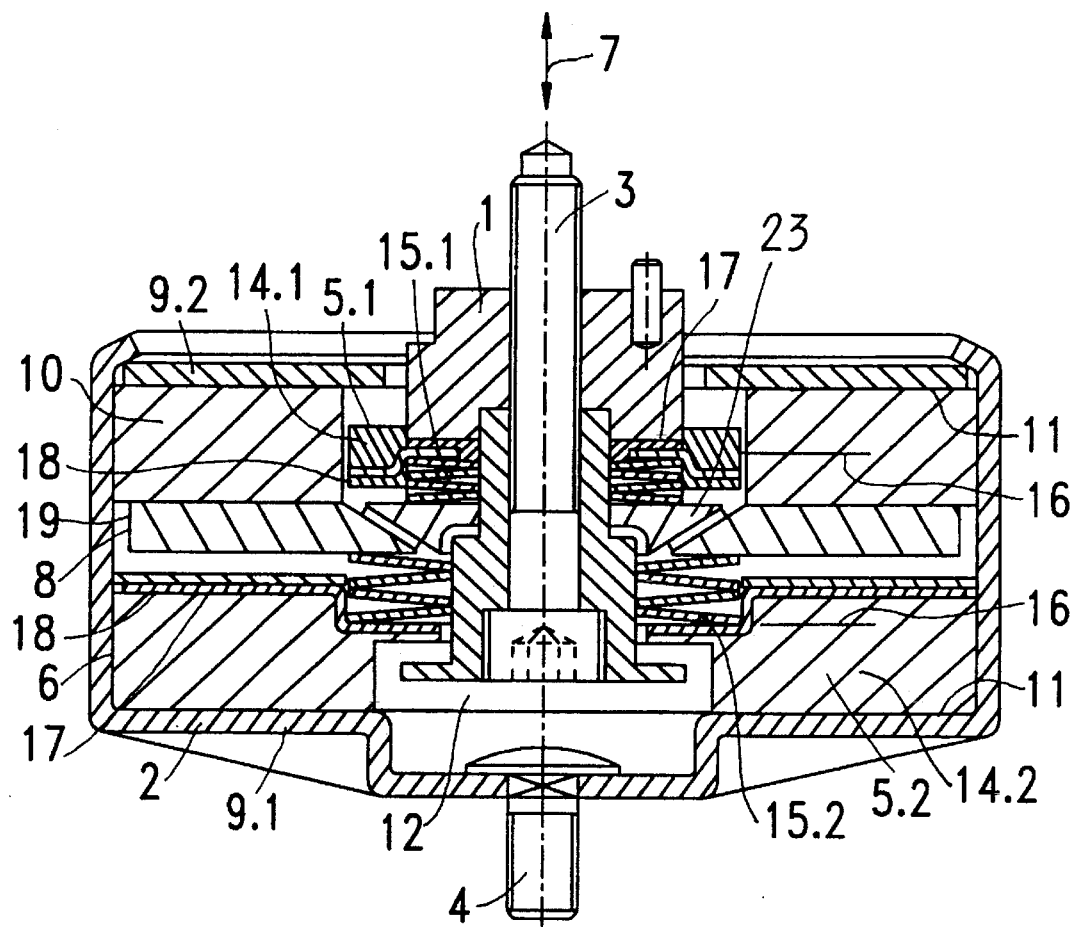
FIG. 5 shows a third exemplary embodiment of the bearing according to the present invention in cross-section.

In FIGS. 1, 3 and 5, respectively, an exemplary embodiment of an elastic bearing is shown, which is designed as an engine bearing for supporting a combustion engine. Each of the bearings includes a support 1 which is formed by a first fastening element 3 and a supporting body 8. The supporting body 8 which extends transversely to the direction of the introduced vibrations. The supporting body 8 is enclosed on the outer peripheral side by a damping element 10 made of an elastomeric material. The damping element 10 can be made, for example, of a flexible foam. The advantage of using a flexible foam is that such a material is easy and quick to process, which means a large number of bearings can be economically produced within a short time. The spring rate of the flexible foam utilized in the present invention is 100N/mm$^2$ and the modulus of elasticity is 1.2N/mm$^2$. The housing 9, which forms the thrust bearing 2, consists of two half-shells 9.1,9.2. One of the half-shells 9.2 is cup-shaped and the other half-shell 9.1 is lid-shaped. In the exemplary embodiment shown in the drawing figures, an elastic spring element 5.1,5.2 is used in the axial direction on both sides of the supporting body 8. The elastic spring element 5.1 facing the structural element to be supported corresponds substantially in its form to the elastic spring element 5.2, which is arranged on the side of the supporting body 8 facing away from the structural element to be supported. All exemplary embodiments are shown in a statically loaded operating state.

Figure 2:
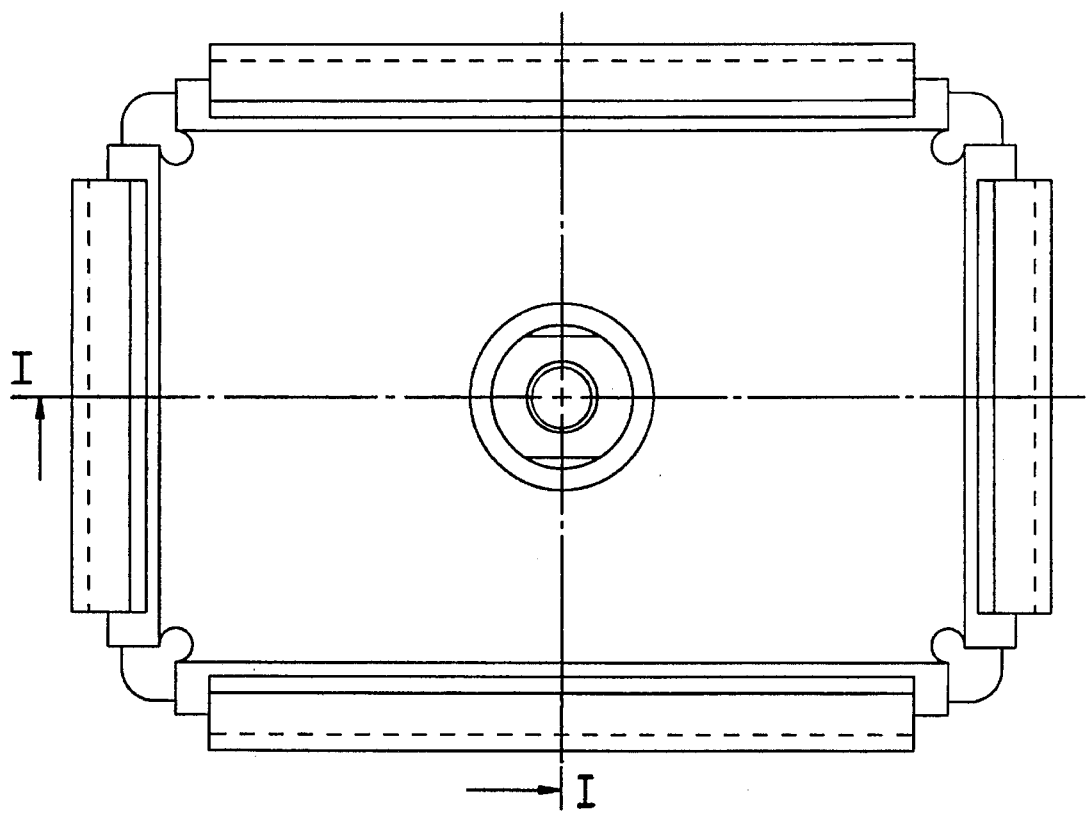
FIG. 2 shows a top view of the bearing of FIG. 1.

In FIGS. 1 and 2, the elastic bearing is provided with an essentially rectangular housing 9 and a damping element 10 shaped correspondingly. In FIG. 1, the bearing from FIG. 2 is represented in cross-section along the line A—A. The rectangular shape of the housing 9 is particularly useful when, because of limited installation space, a circular bearing with a comparatively small damping surface could otherwise only be provided. In spite of the static load, the damping element 10 is arranged substantially without stress within the housing 9. The static load, which acts as a compressive load on the lower elastic spring element 5.2, is completely borne by the cup-spring assembly 15.2, consisting of four cup-springs. The cup-spring assembly 15.2 is braced on one side in the axial direction by the cup-shaped housing half-shell 9.2, and on the other side in axial direction against a reinforcement 17. Reinforcement 17, in this exemplary embodiment, forms a one-piece component with the spring element 14.2. In order to ensure good spatial allocation of the bearing components, the second fastening element 4, which can be a screw, forms a self-centering element for the cup-spring assembly 15.2. A ring-shaped spring element 14.1 made of elastomeric material is arranged on the side of the supporting body 8 facing the structural element to be supported. The spring element is provided with reinforcement 17, which serves as abutment for the cup-spring assembly 15.1. The cup-spring assembly 15.1 in this exemplary embodiment also consists of four cup springs, the spring characteristics of the cup-spring assemblies 15.1, 15.2 differing from one another. The spring characteristics may differ by using materials which differ from each other for the individual cup springs and/or by having cup springs with sizes differing from one another. Just as in the exemplary embodiments of FIGS. 3 and 5, the bearing shown in FIGS. 1 and 2 exhibits effectiveness in damping and mechanical separation of vibrations, both in the compression direction and in the tension direction. In the operating state represented in FIG. 1, the cup-spring assembly 15.1 is only lightly prestressed, in order to avoid rattling noise during operation.

In FIG. 2, the bearing from FIG. 1 is shown in a top view. The lid-shaped housing half-shell 9.1 encloses the first fastening element 3 with radial clearance on the periphery such that, even with the introduction of transverse forces in the bearing, stop contact of the two parts does not take place. The stop bodies 19, which are designed in one piece with the damping element 10, are adjacent to the cup-shaped housing half-shell 9.2 with a clearance which is smaller than the clearance with which the lid-shaped housing half-shell 9.1 encloses the first fastening element 3.

In order to prevent negative influence of the damping element 10 and the spring element 14 on each other, the elastic spring elements 5.1,5.2 are arranged in an unrestricted manner within the cylindrical recess 12 of the damping element 10.

The bearing shown in FIG. 3 differs from the exemplary embodiment shown in FIG. 1 by including a housing which is differently designed. Both the cup-shaped half-shell 9.2 and the lid-shaped half-shell 9.1 are provided with a mounting flange 20, which protrudes radially to the outside in this exemplary embodiment. Spacing elements 21 made of an elastomeric material are arranged between the two flange surfaces. It is advantageous if both housing half-shells 9.1,9.2 are affixed to each other in a vibration-isolating manner, so that the transfer of disturbing vibrations is further reduced. Furthermore, such a refinement has the advantage that, with identical dimensions of the elastic spring elements 5.1,5.2 and the damping element 10, different prestressings can be adjusted, depending upon the thickness of the spacing elements 21 and the starting torque of the screws 22. In addition, settling phenomena of the elastic spring elements, for example, can be compensated for by replacing the existing spacing elements 21 with thinner spacing elements, or removing the spacing elements 21 completely. Moreover, it is always possible to increase the starting torque of the fastening screws in the course of an inspection. Such a compensation for settling phenomena presents itself in particular for highly stressed bearings and/or bearings having large dimensions whose replacement is comparatively costly.

Figure 4:
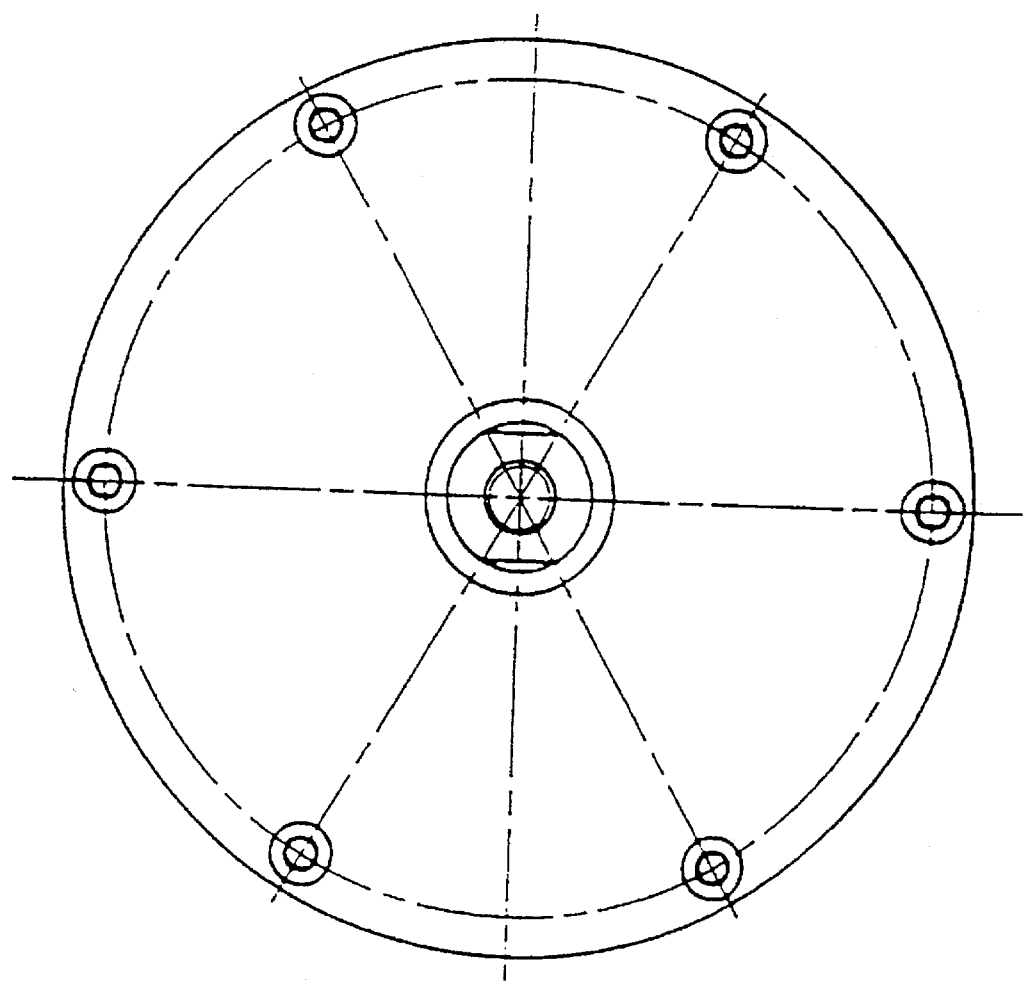
FIG. 4 shows a top view of the bearing of FIG. 3.

It should to recognized that, in contrast to the exemplary embodiment in FIG. 2, the exemplary embodiment shown in FIG. 4 has a circular design.

In FIG. 5, a third exemplary embodiment is shown, similar to the exemplary embodiment of FIGS. 1 and 3, except that the support of the elastic spring elements 5.1,5.2 is differently constructed. In contrast to the exemplary embodiments described above, the ring-shaped spring elements 14.1, 14.2 made of an elastomeric material are not arranged on the surfaces of the supporting body 8, but rather on the front-side inner surfaces 11 of the housing 9. On the other hand, the cup-spring assemblies 15.1, 15.2 are supported on one side in the axial direction by the reinforcement 17 of the spring elements 14.1, 14.2, and on the other side in the axial direction by the supporting body 8. The supporting body 8 in this exemplary embodiment has a two-piece design, the central area 23 of the supporting body 8 being fixed on the annular partial area of the supporting body 8 by means of a conical contact surface.

When, for example, low-frequency vibrations having great amplitudes are introduced into the bearing of FIG. 5, initially a compression of the cup-spring assembly 15.1 results, until the stop buffer 18 of the spring element 14.1 contacts the surface of the supporting body 8. Subsequently, the cup-spring assembly 15.2 is also compressed in the axial direction to the same extent as the damping element 10. In this manner, low-frequency vibrations are damped. On the other hand, when the bearing is subjected to tension, the cup-spring assembly 15.2 is first maximally deformed up to the point that the stop buffer 18 of the spring element 14.2 makes contact with the supporting body 8. At the same time, the central area of the supporting body 8 with the cup-spring assembly 15.1 and the corresponding spring element 14.1 moves in the direction of the front-side inner surface 11 of the housing 9. The axial expansion of the spring element 14.1 limits the relative movement of the support 1 relative to the thrust bearing 2 when tensile loads are introduced, the damping being taken up by the partial area of the damping element 10, which is allocated contiguous to the structural element to be supported. The deformation path of the elastic deformation of the damping element 10 is determined by the clearance between the stop buffer 18 and the surface of the supporting body 8.

The refinements of the exemplary embodiments shown here are capable of being combined with each other in any way desired, the housing 9 of the exemplary embodiment of FIG. 2, for example, being able to be used in an exemplary embodiment according to FIG. 3, while the allocation of the elastic spring elements 5.1,5.2 and the damping element 10, as well as the supporting body 8 can find application in an exemplary embodiment according to FIGS. 1 and 2.

We claim:

1. An elastic bearing comprising:

a support provided with a first fastening element, said support comprising a supporting body extending essentially transverse to the direction of vibrations;

a thrust bearing provided with a second fastening element;

a housing which substantially surrounds said supporting body;

at least one elastic spring element arranged on each axial side of said supporting body, said elastic spring elements being located between a surface of said supporting body and an inner surface of said housing;

at least one damping device comprising at least one ring-shaped damping element made of an elastomeric material, said damping element being joined to said supporting body, said damping device, under static preloading of said elastic bearing, abutting said inner surface of said housing in a substantially stress-free manner, said elastic spring elements being located in a recess in said damping element.

2. The elastic bearing of claim 1, wherein:

at least one of said elastic spring elements comprises a ring-shaped spring element comprising an elastomeric material and said at least one of said elastic spring elements further comprises a cup-spring assembly comprising at least two cup springs arranged series.

3. The elastic bearing of claim 2, wherein:

a reinforcement is arranged on a side of said ring-shaped spring element facing said cup-spring assembly, said reinforcement at least partially enclosing said cup-spring assembly, and wherein said reinforcement acts as a stop buffer to limit relative movements of said supporting body and said housing.

4. The elastic bearing of claim 3, wherein:

said reinforcement is a cup-shaped sheet metal ring which is adhesively joined to one of said spring elements.

5. The elastic bearing of claim 3, wherein:

said reinforcement is capable of contacting said supporting body to limit relative movements.

6. The elastic bearing of claim 3, wherein:

said reinforcement is capable of contacting said housing to limit relative movements.

7. The elastic bearing of claim 2, wherein:

one of said fastening elements provides an inner guide for said cup-spring assembly.

8. The elastic bearing of claim 1, wherein:

said spring elements are not adhered to said damping element or said supporting body or said housing, and said damping element is not adhered to said housing.

9. The elastic bearing of claim 1, wherein:

said spring elements adjoin, with radial clearance, the support or thrust bearing which is radially adjacent said spring elements.

10. The elastic bearing of claim 1, wherein:

said damping element is radially spaced from said housing, said damping element comprising at least one stop body integrally formed with said damping element, said stop body extending toward said housing, a distance between said stop body and said housing being smaller than a distance between said housing and said first fastening element.

11. The elastic bearing of claim 1, wherein:

said housing comprises two half-shells which are joined to each other in a form-locking manner.

12. The elastic bearing of claim 1, wherein:

said elastic bearing is used to support an engine.

13. The elastic bearing of claim 1, wherein:

said support comprises two pieces.

\* \* \* \* \*

UNITED STATES PATENT AND TRADEMARK OFFICE
CERTIFICATE OF CORRECTION

PATENT No. : 5,540,419

DATED : July 30, 1996

INVENTOR(S): Klaus KURR et al.

It is certified that error appears in the above-identified patent and that said Letters Patent is hereby corrected as shown below:

Column 1, line 52, "from" should be --front-- and

Column 2, line 34, "pan" should be --part--.

Signed and Sealed this

Seventeenth Day of December, 1996

Attest:

BRUCE LEHMAN

Attesting Officer     Commissioner of Patents and Trademarks